Aug. 13, 1929.   C. B. NELSON   1,724,217
TURNING TOASTER
Filed Aug. 18, 1927   2 Sheets-Sheet 1
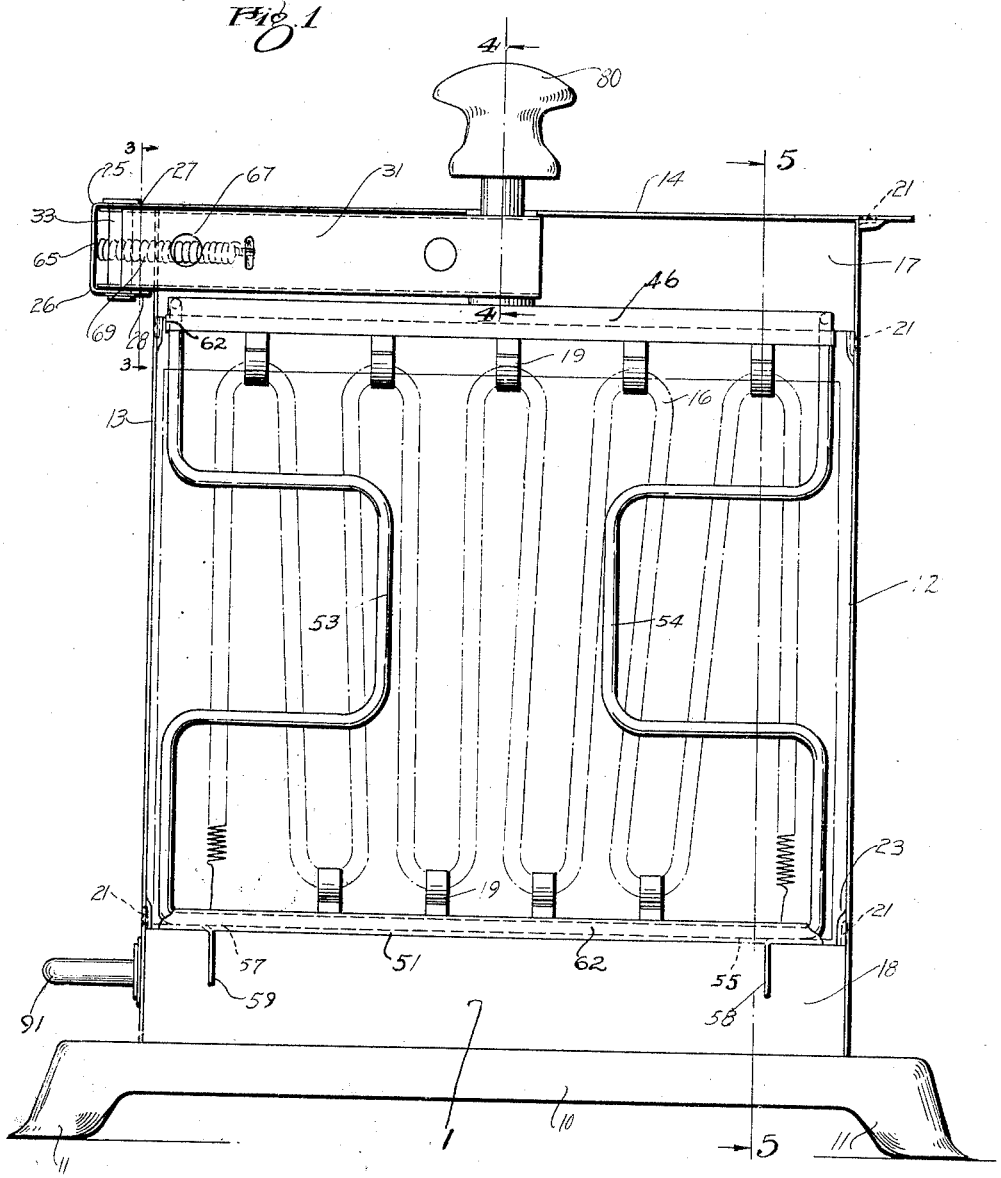
Christ. B. Nelson, Inventor
By Frank M. Slough
His Attorney

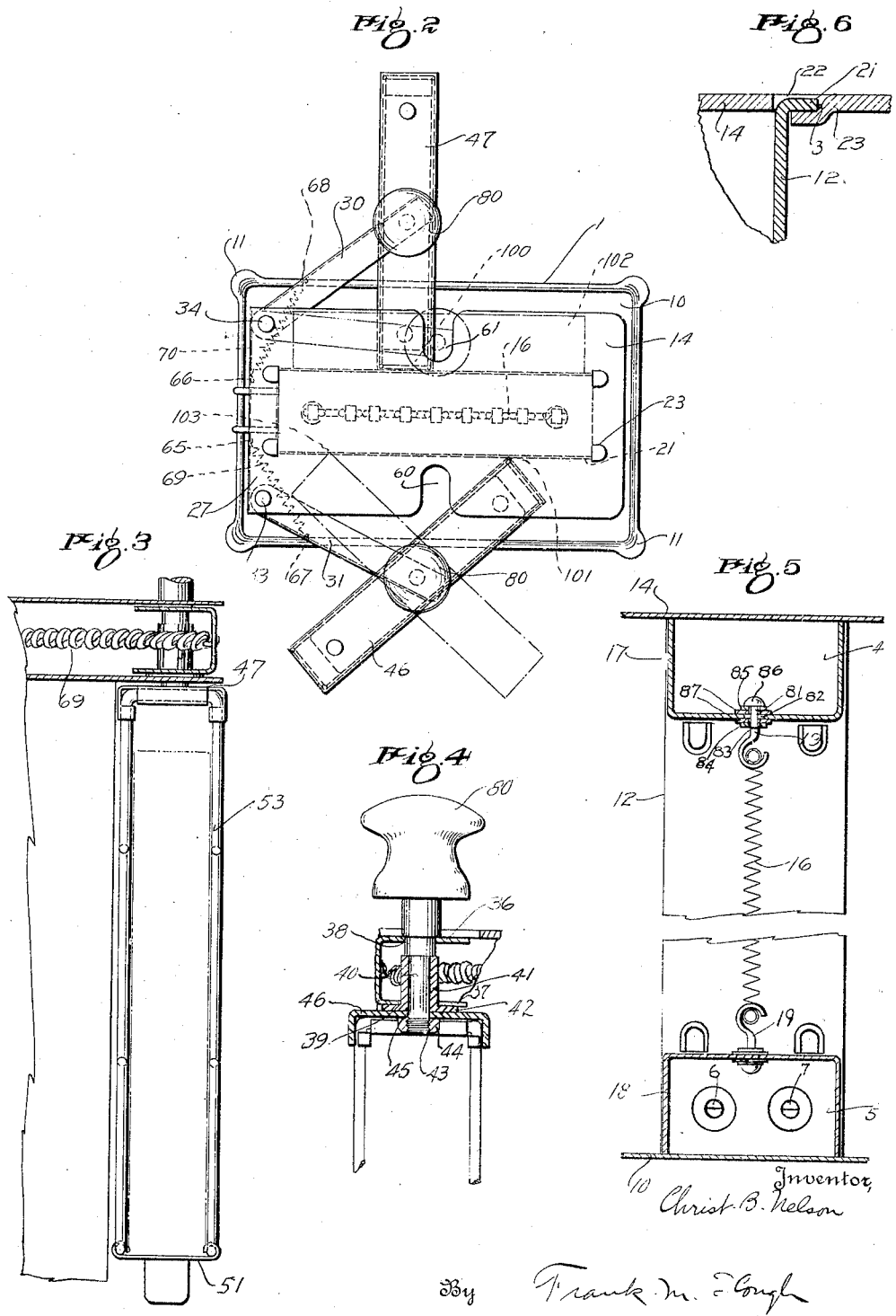

Patented Aug. 13, 1929.

1,724,217

UNITED STATES PATENT OFFICE.

CHRIST B. NELSON, OF CLEVELAND, OHIO.

TURNING TOASTER.

Application filed August 18, 1927. Serial No. 213,732.

My invention relates to electric toasters, and more particularly it relates to an improved mechanism for turning the slice of bread relative to the heater to toast either side of the same.

One of the objects of my invention is to provide an improved slice turning mechanism adapted to turn the slice of bread to a radiant heating element for toasting either side of the same, without removing the slice of bread from the slice holder.

Another object of my invention is to provide an improved slice turning mechanism, wherein an operating handle may be actuated to swing the toast away from the source of heat, as well as reverse the slice to present either side thereof to the source of heat.

Another object of my invention is to provide a slice holder and turning mechanism which is durable in construction, economical to manufacture, and wherein the parts comprising the same are assembled and secured together without the aid of nuts and bolts or screws.

These and other objects of my invention and the invention itself will become apparent from reference to the following description of an embodiment thereof and in which embodiment reference will be had to the accompanying drawings forming a part of this specification.

Referring to the drawings:

Fig. 1 is a side elevational view of an electric toaster embodying my invention;

Fig. 2 is a top plan view thereof illustrating several operative positions of the slice holder in use, the view being shown reduced to substantially one-half actual size;

Fig. 3 is a fragmentary end elevational view of the foregoing embodiment, some of the parts being shown in section;

Figs. 4 and 5 are fragmentary sectional views of certain detailed parts of the foregoing embodiment taken on the lines 4—4 and 5—5, respectively, of Fig. 1; and Fig. 6 is a fragmentary sectional view, enlarged of the frame fastening portions.

Referring to all of the figures of the drawing, in all of which like parts are designated by like reference characters, at 1, I show an electric toaster having the usual skeleton frame or standard comprising a base plate 10 having supporting legs 11, upright end plates 12 and 13, and a top plate 14. Said frame is also provided with supporting means for a source of radiant heat, which includes a heating surface formed of coiled resistance wire 16 and adapted to be alternately hooked over hooks 19 on top and bottom supporting channel-shaped plates 17 and 18. Said channel-shaped plates are each secured between the side plates 12 and 13, one adjacent the base and the other adjacent to the underside of the top plate with their respective open sides facing away from each other and closed by the top plates 14 and base 10, respectively, to provide protective housings 4 and 5 for lead-in wires 6 and 7.

The base 10, top 14, upright end plates 12 and 13, and the channel-shaped plates 17 and 18 are provided with a plurality of ears 21 and a plurality of slots 22, as best shown in Fig. 6, into which the ears may be projected. In assembling the frame, said ears are inserted into the respective adjacent slots and are bent at right angles into depressions 3 adjacent the slots so that none of the ears project laterally of any of the plates and are adapted to secure the various frame plates on the base, in a unitary structure. Each of the frame sections are preferably stamped from sheet steel by forming dies and are preferably nickel-plated before assembling the same together.

One end of the top plate 14, as best shown in Fig. 1, is bent downwardly at 25 and bent back upon itself at 26 to provide a pair of opposed wall pivot portions 27 and 28 for a pair of arms 30 and 31, one at each side of the frame, adapted to swing on vertically disposed pins 33 and 34 carried by the opposed portion 27 and 28. Said arms are preferably channel-shaped in transverse section, such a construction will more effectively reinforce the same against distortional stresses. The ends of the opposed wall portions 36 and 37, as best shown in Fig. 4, of the arms are provided with aligned apertures 38 and 39 to receive vertically disposed shafts 40, rotatable in bearing bushings 41 disposed in the lower wall opening 39 of the arms, said bushing being held against upward movement therein by virtue of an annular flange 42, and against downward movement by the toast holder plates. Said shafts project downwardly in the apertures 39 and is threaded at 43 and extends into apertures 45 in top plates 46 and 47 of a pair of slice holders for the reception of a retaining nut 44, one of the slice holders being disposed on each side of the heating element.

The slice holders comprise the top plates 46 and bottom plates 51 secured to each other by wire side members 53 and 54 bent intermediate their ends towards each other to provide means for holding a slice of bread against lateral movement therein. The lower plates 51 are pierced at 55 and 57 and the pierced portions are bent downwardly away from the plates to provide stops 58 and 59 adapted to contact on the outer sides of the lower channel-shaped plate 18 to prevent the slice holders from contacting with the heating element. The top plate 14 is provided with opposed recesses 60 and 61 into which the shafts 40 are disposed when the slice holders engage with the sides of the channel-shaped plates 17 and 18. Each of the plates 46, and 51 are rolled around the wire side members at 62 to form a skeleton frame.

The upper ends of the shafts 40 are provided with handles 80. The end wall portion of the top plate and the side walls of the arms are each provided with apertures 65, 66 and 68, respectively, for the reception of the ends of coiled springs 69 and 70 which springs are adapted to normally retain the arms at their innermost positions wherein the slice holders are adjacent the heating element.

Referring to Fig. 5 of the drawing, wherein I show, one of the hooked pins 19 about which the rheostat wire 16 is looped. A plurality of said hooked pins are carried by the channel-shaped plates 17 and 18 in spaced relation to each other and projected towards each other. Each hook-shaped element is reduced at 81 and is passed into a relatively large aperture 82 in the plates 17 and 18, shoulder 83 thereof is adapted to engage a washer 84 disposed to one side of the plate, and a second washer 85 is placed on the end of the reduced portion of the hook-shaped element which is upset at 86 at its end over the inner washer 85 for securing the washers and pins together. Mica disks 87 are disposed between the washers 84 and 87 to provide insulation for the hooked pins, thereby preventing any short-circuiting of the current in the frame. Contact pins 91 project laterally of the end plate 13, and are of the usual construction adapted to receive a two-point plug socket of the standard type to provide a connection for the heating element with a source of electric current.

As best shown in Fig. 2, when it is desired to toast a slice of bread, slices may be presented from either end into the slice holders by either holding the slice holders away from the heating element by the handle or permitting the end thereof to bear against the plate 18, as illustrated at 100. The handle may be rotated to shift the relative position of the slice holder to that shown at 101, whereby the coil spring will draw the slice holder towards the heating element as shown at 102 in dotted lines. This position may be retained until the slice is toasted to the desired sufficiency on one side. Rotation of handle in either direction after one side has been toasted will cause one end of the slice holder to bear against the side of the plates 17 and 18, as shown at 101, and at the same time will draw the other end of the slice holder away from the plate 18 against the tension of the coil spring. Continued rotation of the handle will cause the edge of the slice holder to again engage the end plate 18 as at 100 and ride along into the position 102 wherein the coil spring will draw the slice holder and the arm into longitudinal engagement with the plate 18, with the reversed side of the slice presented to the heating element, and in this position the handle supporting shaft will again be projected into the slot 60 in the top plate.

It is to be understood that the toast may be turned by swinging the bracket away from the plate 18 on its pivot by grasping the handle and then rotating the slice holder free from any contact with the plate 18, and then permitting the coil spring to draw the slice holder and arm toward the heating element with the slice holder engaging the plate 18, with the reversed side of the slice presented towards the heating element.

A toaster constructed as herein described is economical to manufacture and assemble, inasmuch as all assembling operations may be performed by stamping dies, by virtue of the ears and slots allowing the parts to be rigidly secured together rapidly. This feature of my invention is highly advantageous over the employment of the usual bolts and nuts.

Arms 31 and 32 and the reversely turned ends 25 of the top plate 14 comprise an enclosing housing for the coil springs 69 and 70 when the toaster is in use, thereby shielding the springs from the heat radiating from the heating element 16. It is well known that the heat tends to diminish the resiliency of the springs by decreasing the temper thereof. The springs are also so disposed relative to the heating element that they will not receive deposits of moisture thrown off by the bread during the toasting thereof by the heating element which moisture increases the possibility of the springs rusting or becoming deteriorated and accordingly rendering the springs useless whereby they must be replaced frequently.

Having thus described my invention in a specific embodiment I am aware that numer- ous and extensive departures may be made from the embodiment herein illustrated and described but without departing from the spirit of my invention.

I claim:

1. In a toaster, the combination of a frame, said frame having a supporting base and end top plates, a heater, and a supporting means in the frame for the heater, said top plate having an end thereof bent back upon itself to provide a pair of spaced wall portions, aligned apertures therein, a pin disposed in the apertures of said spaced portion, of an arm pivoted on the pin and adapted to swing on a vertical axis away from the heater, a slice holder rotatably mounted on the end of the arm, a rotatable handle for the slice holder, said handle when rotated adapted to swing the arm away from the heater and reverse the slice holder to present an opposite side of the slice to the heater, and means for normally holding slice holder adjacent the heater.

2. In a toaster, the combination of a frame, said frame having a supporting base and end top plates, a heater, and a supporting means in the frame for the heater, said top plate having an end thereof bent back upon itself to provide a pair of spaced wall portions, aligned apertures therein, a pin disposed in the apertures of said spaced portion, of an arm pivoted on the pin and adapted to swing on a vertical axis away from the heater, said arm channel shaped, the opposed wall portions thereof engaging the inner opposed spaced wall portions of the top plate bent end, a slice holder rotatably mounted on the end of the arm, a rotatable handle for the slice holder, said handle when rotated adapted to swing the arm away from the heater and reverse the slice holder to present an opposite side of the slice to the heater, and means for normally holding the slice holder adjacent the heater.

3. In a toaster, the combination of a frame comprising a supporting base, a top plate and end walls supporting the top plate on the base, radiant heating means interposed between the end plates and intermediate the top plate and base, and a pair of slice holders adapted for disposition laterally of the heating means, supporting means for the slice holders comprising an arm adapted to overly the slice holder, said slice holder swivelly supported in its mid upper portion from the free end of the arm, means to swiveably support the arm disposed adjacent the top one of the end plates, said means comprising vertically spaced portions of the frame and a vertical pin supported by said spaced frame portions, said arm making engagement with said pin in vertically spaced portions.

4. In a toaster, the combination of a frame comprising a supporting base, a top plate and end walls supporting the top plate on the base, radiant heating means interposed between the end plates and intermediate the top plate and base, and a pair of slice holders adapted for disposition laterally of the heating means, supporting means for the slice holders comprising an arm adapted to overly the slice holder, said slice holder swivelly supported in its mid upper portion from the free end of the arm, means to swivelably support the arm disposed adjacent the top one of the end plates, said means disposed adjacent the top portions of the frame and a vertical pin supported by said spaced frame portions, said arm being of channeled form and having vertically spaced side walls and a connecting end wall, said side walls having aligned perforations near the supported end of the arm adapted to receive said vertical pin projected therethrough.

5. In a toaster, a frame, said frame having a top plate, said top plate having an end thereof bent back upon itself to provide a free space therebetween, a channel shaped arm pivoted to the top plate adjacent the free space, a heating element mounted in the frame, and a coil spring having one end thereof anchored to the frame and the other end thereof anchored to the pivoted arm, said spring disposed wholly in the free space of the top plate and in the channel portion of the arm whereby it is shielded from heat and moisture generated by the heater.

In testimony whereof I hereunto affix my signature this 12 day of August, 1927.

CHRIST B. NELSON.